United States Patent [19]
Park et al.

[11] Patent Number: 5,922,629
[45] Date of Patent: Jul. 13, 1999

[54] SILICON NITRIDE CERAMIC SLIDING MATERIAL AND PROCESS FOR PRODUCING THE SAME

[75] Inventors: Jin-Joo Park; Yasushi Mochida; Akira Kuibira; Osamu Komura; Akira Yamaguchi, all of Itami, Japan

[73] Assignee: Sumitomo Electric Industries, Ltd., Japan

[21] Appl. No.: 08/847,746

[22] Filed: Apr. 22, 1997

[30] Foreign Application Priority Data

Apr. 26, 1996 [JP] Japan ................................. 8-107103

[51] Int. Cl.[6] .................................................. C04B 35/587
[52] U.S. Cl. ...................... 501/97.2; 501/97.3; 264/665; 264/666; 264/683
[58] Field of Search ................................. 501/97.2, 97.3; 264/665, 666, 683

[56] References Cited

U.S. PATENT DOCUMENTS

| | | |
|---|---|---|
| 4,629,707 | 12/1986 | Wolfe . |
| 5,098,872 | 3/1992 | Suyama et al. ......................... 501/97.2 |
| 5,118,644 | 6/1992 | Watanabe et al. ...................... 501/97.2 |
| 5,120,685 | 6/1992 | Quadir et al. .......................... 501/97.2 |
| 5,229,046 | 7/1993 | Watanabe et al. ...................... 501/97.2 |
| 5,401,450 | 3/1995 | Mitomo et al. ......................... 501/97.2 |
| 5,675,210 | 10/1997 | Komura et al. ........................... 310/90 |
| 5,691,261 | 11/1997 | Takahashi et al. ..................... 501/97.2 |
| 5,767,026 | 6/1998 | Kondoh et al. ......................... 501/97.2 |

FOREIGN PATENT DOCUMENTS

| | | |
|---|---|---|
| 0414383 | 2/1991 | European Pat. Off. . |
| 0587906 | 3/1994 | European Pat. Off. . |
| 0633406 | 1/1995 | European Pat. Off. . |
| 63-55163 | 3/1988 | Japan . |
| 5155662 | 6/1993 | Japan . |
| 6200936 | 7/1994 | Japan . |
| 7267738 | 10/1995 | Japan . |

*Primary Examiner*—Karl Group
*Attorney, Agent, or Firm*—Bierman, Muserlian and Lucas

[57] ABSTRACT

A silicon nitride ceramic sliding material comprising silicon nitride crystal grains and a grain boundary phase and having a porosity of 2 to 10% and a maximum pore size of 20 to 100 $\mu$m. The silicon nitride ceramic sliding material preferably has a textural structure wherein the proportion of the total area of silicon nitride crystal grains of 0.1 to 10 $\mu m^2$ in area to the total area of all the silicon nitride crystal grains present in an arbitrary two-dimensional cross section is 30 to 90% and the proportion of the number of silicon nitride crystal grains of 2 to 10 in aspect ratio to the number of all the silicon nitride crystal grains present in that cross section is at least 20%. The material is produced by mixing a silicon nitride powder with a sintering aid powder, molding the resulting mixture, then heat-treating the resulting molded body in a nitrogen-containing atmosphere under reduced pressure at 1,000 to 1,500° C., and then sintering it in a nonoxidizing atmosphere under ordinary pressure or under pressure, at 1,550 to 1,800° C.

6 Claims, No Drawings

SILICON NITRIDE CERAMIC SLIDING MATERIAL AND PROCESS FOR PRODUCING THE SAME

BACKGROUND OF THE INVENTION

1. Field of the Invention

The present invention relates to a silicon nitride ceramic sliding material excellent in abrasion resistance and sliding properties at room temperature in particular, which material is used in rotating and sliding sites in office automation apparatuses, electric appliances, computer-related apparatuses, and motors, engines, etc. as automotive parts, etc.

2. Description of the Prior Art

A silicon nitride ceramic is a material, which is lightweight and excellent in heat resistance and abrasion resistance in comparison with metal materials, and is also well balanced between mechanical strength and toughness in comparison with other ceramic materials. Thus, it is expected to be put into practical use in a wide variety of uses for structural parts including engine parts of a car, sliding parts of office automation apparatuses, and heat-resistant and abrasion-resistant parts of a gas turbine engine.

In the prior research and development of a silicon nitride ceramic material for such a variety of uses, the mainstream of material development is mainly aimed at improvements in brittleness and abrasion resistance inherent in the material as well as an improvement in mechanical strengths at high temperatures in the direction of evolution toward high-temperature uses.

For example, Japanese Patent Laid-Open No. 7-267738 (1995) discloses an abrasion-resistant silicon nitride ceramic material densified to a theoretical density by twice sintering a powder mixture of $Si_3N_4$ admixed with a small amount of a sintering aid composed of MgO, $ZrO_2$ and $CeO_2$ in a nitrogen atmosphere containing MgO gas and CO gas to control the amount of the grain boundary phase. Japanese Patent Laid-Open No. 5-155662(1993) discloses a silicon nitride ceramic material likewise densified close to the theoretical density and hence improved in abrasion resistance by primary sintering under ordinary pressure and subsequent secondary sintering in a pressurized atmosphere while controlling the amount of the grain boundary phase of an Al compound, etc. to small one. On the other hand, Japanese Patent Laid-Open No. 63-55163(1988) discloses a silicon nitride ceramic material improved in chipping resistance during sliding by controlling the pore size while providing a porosity of at most 3%.

Further, Japanese Patent Laid-Open No. 6-200936(1994) discloses a high-strength silicon nitride ceramic high-speed bearing material comprising equiaxed α-grains and needle-like β-grains, and having a dense and fine texture having a grain boundary phase content of at most 15 vol. %, a linear density per 30 μm in length (i.e., the number of grains cut across by a 30 μm line when one section thereof is cut by this line) of at least 35 and a porosity of at most 3%.

Besides, a method wherein a grain boundary glass phase is partly crystallized by carrying out a heat treatment after sintering for forming a dense material has been attempted in order to enhance the mechanical strengths thereof at high temperatures.

On the other hand, in order to improve the sliding surface of a material, very smooth finishing of the surface mainly for mitigation of the initial sliding resistance thereof and formation of a film of a fusion-resistant and agglutination-resistant material on a base material have been actively attempted.

As for the improvements of the bodies of sliding materials themselves in the foregoing description, the bodies are all improved in mechanical strengths and abrasion resistance in such a way as to resist a high load during sliding at ordinary to high temperatures by densification with control of pore formation to the utmost, by fine texturing with control of the amount of a brittle glass phase as the grain boundary phase to the utmost, or partial crystallization of the grain boundary phase.

On the other hand, as for the improvement of the sliding surface, the abrasion resistance and sliding resistance properties thereof are improved by smoothing of the surface or by fresh formation of an alternative material surface.

Meanwhile, uses of sliding parts are not necessarily limited to high-temperature or high-load uses, but include many applications under comparatively low loads in comparison with the above-mentioned uses, at room temperature, for example, uses in rotating or sliding sites of motors in electric appliances, office automation apparatuses, computer-related apparatuses, etc., as well as uses in some automotive parts. In such fields, there is a case where conventional texture designing of a densified ceramic material directed toward higher toughness and strength is not necessarily proper. For example, there is a case where the hardness of a material is particularly increased for an improvement in abrasion resistance at the sacrifice of toughness or with a difficulty in shape fabrication. Thus, much labor is necessary for smoothing a surface by mirror polishing. Further, in order to obtain a dense and high-strength material, many production managements leading to an increase in cost become necessary, which include selection of starting material powders, specification of mixing and molding conditions and sintering conditions, etc. On the other hand, formation of an abrasion-resistant surface portion of an alternative material needs extra labor for such formation, and further always involves problems of deterioration of bonding strength in the formed interface and delamination due to a difference in thermal expansion.

The silicon nitride ceramic material, which is hard to subject to seizing, fusion or agglutination in comparison with metal materials as described above, is expected to be put into practical use as a new sliding material by making the most of its merits, though it involves various problems of production and quality. However, even the foregoing high-performance material is abraded under severe sliding conditions. An abrasion powder worn off is acceleratively formed under some sliding conditions once abrasion begins, whereby the sliding properties may probably be rapidly deteriorated. In an extreme case, sliding surfaces may be mutually locked, thus resulting in no movement thereof. In general, such friction and abrasion phenomena of a ceramic sliding material, though affected by factors in sliding environment, such as sliding pressure, sliding speed, temperature and atmosphere, are notably affected by whether its abrasion resistance on its surface is good or poor. They are of course greatly affected by the surface structure of the material during sliding. As already described, in development of conventional ceramic sliding materials, the main approach to improvements of materials themselves is to cope with sliding environment, and the main approach to improvements of their surface structures is adjustment of initial surface roughness or covering of their surfaces with abrasion-resistant materials.

An improvement in the environmental resistance of a material itself and obtainment of smoothness of a sliding surface are surely fundamental to obtaining a ceramic sliding material excellent in friction and abrasion resistance. In order to suppress the sliding friction and abrasion of a material under circumstances wherein they are satisfied to some extents, nevertheless, how to design the surface structure of an abrasion-resistant material is particularly important. There is a demand for designing a material capable of efficiently exhibiting stable sliding properties in a sliding state with attention focused on the mechanism of the abrasion resistance of the surface of the material during sliding.

SUMMARY OF THE INVENTION

In order to solve these problems, the inventors of the present invention have been engaged in development of a silicon nitride ceramic material with quantitative analysis of the correlation between the texture of a material and the friction and abrasion resistance properties thereof to find out that the friction and abrasion properties of a silicon nitride ceramic material during sliding can be improved by materializing a specific textural structure of the material. The present invention has been completed based on this finding.

Specifically, the present invention provides (1) a silicon nitride ceramic sliding material comprising silicon nitride grains and a grain boundary phase; which has a porosity of 2 to 10% and a maximum pore size of 20 to 100 $\mu$m. The present invention further provides:

(2) a silicon nitride ceramic sliding material having the foregoing features and such desirable additional features of textural structure that the total area of silicon nitride crystal grains of 0.1 to 10 $\mu m^2$ in area accounts for 30 to 90% of the total area of all the silicon nitride crystal grains when the areas of all the silicon nitride crystal grains present in an arbitrary two-dimensional cross section thereof are counted, and that the proportion of the number of silicon nitride crystal grains of 2 to 10 in aspect ratio to the number of all the silicon nitride crystal grains is at least 20%.

Additionally stated, the term "silicon nitride crystal grains" as used in the present invention is a generic name of crystal grains of pure silicon nitride $Si_3N_4$, and crystal grains additionally containing other element(s) such as Al, Mg, a rare earth element and/or oxygen in a solid solution, and hence encompassing a sialon. In the present invention, they are also referred to as "matrix grains" or "matrix crystal grains" in some cases.

According to a further preferred embodiment of the present invention, there is provided:

(3) a silicon nitride ceramic sliding material, wherein the amount of the grain boundary phase thereof is at most 15 vol. % (exclusive of 0 vol. %). According to the present invention, there is further provided:

(4) a silicon nitride ceramic sliding material, wherein the grain boundary thereof in particular contains at least one selected from the group consisting of Y, Al, Mg, Ti and Zr.

The textural structure of the material of the present invention as set forth in (2) and (3) above can be confirmed according to the following procedure. Specifically, the following pretreatment is first effected for quantitative analysis of the textural structure of a material. An arbitrary cross section of the material is polished into a specular state, and the resulting mirror surface is subjected to etching treatment to form an uneven difference in level between the silicon nitride matrix crystal grains and the grain boundary phase. Examples of this etching treatment include a method wherein it is effected with an activated mixed gas of trifluoromethane $CHF_3$ and oxygen $O_2$, and a method wherein it is effected with a mixed acid of hydrochloric acid HCl and hydrogen peroxide $H_2O_2$. Either one of them may be used.

An arbitrary site of the surface on which such an uneven difference in level between the matrix crystal grains and the grain boundary phase is formed is photographed using a scanning electron microscope at a magnification of at most 50,000 (preferably 10,000 to 20,000). The photograph is analyzed by image processing. According to the image-processing analytical method, the matrix crystal grains and the grain boundary phase in a field of vision in the photograph are first binarized and distinguished on the basis of a shade of color. The ratio of major, axis diameter/minor axis diameter, i.e., aspect ratio of each matrix crystal grain, and area of each one of all the matrix crystal grains are then calculated. The maximum size and area of every pore, and the area of the grain boundary phase are also calculated. The foregoing data accumulation work is usually done using a commercially available computer software for exclusive use in image processing. The porosity, the maximum pore size distribution, the matrix crystal grain area distribution, the proportion of matrix crystal grains having an aspect ratio falling within a given range, and the volume proportion of the grain boundary phase are calculated by statistical processing of such data.

The silicon nitride ceramic sliding material of the present invention is produced according to the following process.

(1) A silicon nitride powder is mixed with a sintering aid powder to prepare a mixture, which is then molded, then heat-treated in a nitrogen-containing atmosphere under reduced pressure at 1,000 to 1,500° C., and then sintered in a nonoxidizing atmosphere under ordinary pressure or in the same gas atmosphere under pressure at 1,550 to 1,800° C. According to a preferred method, (2) the above-mentioned mixture of the silicon nitride powder with the sintering aid powder is further admixed with an Fe or Fe element compound powder of at most 10 $\mu$m in average particle size, the amount of which is 0.0005 to 0.05 wt. % in terms of Fe element. According to a method over the method (2), (3) the amount of the sintering aid powder is controlled to at most 15 vol. %. According to a further method, (4) an $Y_2O_3$ powder and at least one selected from the group consisting of $Al_2O_3$, $MgAl_2O_4$, MgO, $TiO_2$, and $ZrO_2$ are particularly used as the sintering aid.

DETAILED DESCRIPTION OF THE PREFERRED EMBODIMENTS

An object of the present invention is to provide a silicon nitride ceramic sliding material especially excellent in friction and abrasion resistance properties at ordinary temperature.

The silicon nitride ceramic sliding material of the present invention is constituted of a silicon nitride sintered body having a textural structure having a porosity of 2 to 10% and the maximum pore size thereof controlled in the range of 20 to 100 $\mu$m. Additionally stated, the porosity is preferably 2 to 4%. When the porosity and the maximum pore size are set in these ranges, there can be obtained a sliding material making the absorption of impact energy easy during sliding, and excellent in abrasion resistance and chipping resistance even during high-speed sliding involving a tap abrasion phenomenon. When the porosity is lower than 2% or when the maximum pore size is smaller than 20 $\mu$m, impact energy absorption becomes difficult. On the other hand, when the porosity exceeds 10% or when the maximum pore size exceeds 100 $\mu$m, pores change from closed cells to open cells, whereby the resulting sintered body is lowered in mechanical strength and is liable to fracture.

Besides the foregoing pore control, the grain size distribution of the sliding material of the present invention is preferably further controlled in such a way that the proportion of the total area of matrix grains of 0.1 to 10 $\mu m^2$ in area to the total area of all the matrix grains present in an arbitrary two-dimensional cross section is in the range of 30 to 90%, while the grain shape distribution thereof is preferably controlled in such a way that the proportion of the number of matrix grains of 2 to 10 in aspect ratio to the number of all the matrix grains is at least 20%. When the grain size distribution and the grain shape distribution are controlled in these ranges, a further improvement in friction and abrasion resistance properties can be attained. In this case, when the areal proportion of matrix grains of 0.1 to 10 $\mu m^2$ is lower than 30%, the matrix grain distribution is divided into a large side and a small side. Thus, local delamination due to excessively small-area grains and local cracking due to excessively large-area grains are liable to occur. Accordingly, the grain size distribution is desirably controlled in the above-mentioned range. Additionally stated, the grain size distribution is further desirably set in the range of 50 to 85%.

Further, the matrix grain shape is controlled in the above-mentioned range simultaneously with the foregoing grain size control. When it is set in this range, the resulting texture becomes a crosslinked structure wherein rod-like or needle-like grains high in aspect ratio are mutually entangled in addition to the foregoing grain size control, while the skeletal structure of the resulting sintered body is reinforced to enhance the mutual bonding strength between grains. Thus, the matrix grains, even if abraded, are hard to peel off. This number proportion is preferably at least 30%.

When the amount of the grain boundary phase is controlled to at most 15 vol. % (exclusive of 0%) simultaneously with control of these grain size and grain shape distributions, an improvement in friction and abrasion resistance can be attained. When the amount of the grain boundary phase exceeds 15 vol. %, abrasion and delamination of the grain boundary phase during sliding are liable to occur. The further preferred amount of the grain boundary phase is 5 to 10 vol. %. Additionally stated, a combination of $Y_2O_3$ with at least one selected from the group consisting of MgO, $MgAl_2O_4$, $TiO_2$ and $ZrO_2$ is especially desirably used as a sintering aid.

The following description will be made of the process for producing a ceramic sliding material according to the present invention.

The sliding material of the present invention is obtained by mixing a silicon nitride powder with a sintering aid, molding the resulting powder mixture, then heat-treating the resulting molded body in a nitrogen-containing atmosphere under reduced pressure at 1,000 to 1,500° C., and then sintering it in a nonoxidizing atmosphere under ordinary pressure or in a pressurized nonoxidizing gas atmosphere at a temperature of 1,550 to 1,800° C.

The silicon nitride powder to be used, though not particularly limited, may be one having an α-crystal content of at least 70% and an average particle size of at most 10 $\mu m$, preferably one having an α-crystal content of at least 90% and an average particle size of at most 1 $\mu m$. When the α-crystal content and the average particle size are in the above-mentioned ranges in combination with the foregoing heat treatment, the sintered grain size distribution and the sintered grain shape distribution according to the present invention can be more easily obtained. The average particle size of the sintering aid powder is desirably of substantially the same degree. As the sintering aid, a rare earth element compound such as $Y_2O_3$ may be used together with at least one selected from among Al element compounds such as $Al_2O_3$ and AlN, alkaline earth element compounds such as MgO, alkaline earth element and Al element compounds such as $MgAl_2O_4$, and compounds of various transition metals of the group IVa, Va, VIa, etc. (e.g., $TiO_2$, $ZrO_2$, $WO_3$, and $V_2O_5$) for proper combination.

The molded body is heat-treated in a nitrogen-containing atmosphere under reduced pressure at 1,000 to 1,500° C. before sintering for the purpose of controlling the porosity and maximum pore size in the aforementioned ranges after sintering. Additionally stated, this treatment may be effected in the course of heat-up for sintering, followed by preparation of a suitable nonoxidizing atmosphere and further heat-up for sintering.

Pore control in a sintered body has hitherto been done mainly by adjustment of an organic binder component used for molding the powder and its amount, adjustment of binder removal conditions, and/or addition of a high-temperature volatile component other than the binder to the powder. However, these methods are mainly aimed at securing a high porosity, and a method of controlling a pore size distribution together with a porosity within a region of relatively small porosity has not been found out.

In view of the fact that the molded body comprising silicon nitride as the main component involves gas evolution attributed to liquid phase formation in a temperature region below the sintering temperature, the inventors of the present invention have found out that the porosity and the maximum pore size after sintering can be controlled by heat treatment under reduced pressure in a specific temperature range within the above-mentioned temperature region before sintering. When the treatment temperature is lower than 1,000° C., a pore state aimed at by the present invention cannot be provided because of no substantial gas evolution. On the other hand, when the treatment temperature exceeds 1,500° C., the amount of gas evolved per unit time is increased excessively, whereby the maximum pore size after sintering unfavorably exceeds 100 $\mu m$. Further, when the heat treatment before sintering according to the present invention is not effected, the porosity and the maximum pore size are respectively increased to a high porosity and a large maximum pore size falling outside the scope of the present invention. Additionally stated, the heat treatment time is preferably in the range of 0.5 to 10 hours. When it is too short, a difficulty is encountered in securing the foregoing pore controlling effect. When it is too long, an increase in that effect cannot well be expected. Accordingly, it is desirably set in that range. It is usually about 1 to 5 hours.

Sintering is effected in a nonoxidizing atmosphere because a decrease in sinterability due to surface oxidation occurs otherwise. In this case, the temperature is set at 1,550 to 1,800° C. At a temperature lower than 1,550° C., sintering is so unsatisfactory that the textural structure aimed at by the present invention cannot be obtained. On the other hand, when it exceeds 1,800° C., the texture is liable to be coarsened while the pore structure aimed at by the present invention cannot be obtained. Accordingly, in either case, good sliding properties cannot be obtained.

In the case of a high porosity after sintering under ordinary pressure, it is also conceivable to further carry out a hot isostatic pressing (HIP) treatment for crushing pores after sintering, when occasion demands. In the case of ordinary-pressure sintered bodies having a comparatively high porosity, however, some open-cellular products are sometimes produced due to lot-to-lot variation during sintering under ordinary pressure. In this respect, pore control through the HIP treatment is not necessarily proper. When pores are closed with a maximum pore size in the range of 20 to 100 μm, nevertheless, the HIP treatment may be effected in the present invention if positive pore control is necessary.

The pore state of the sliding material of the present invention can be controlled according to the foregoing basic procedure. Besides, the initial mixture of the silicon nitride powder with the sintering aid powder may further be admixed with 0.0005 to 0.05 wt. % as Fe element of an Fe or Fe element compound powder of at most 10 μm in average particle size, whereby a sliding material further excellent in friction and abrasion resistance can be obtained. Addition of such a small amount of Fe or the Fe element compound can control the grain size distribution and grain shape of the silicon nitride crystal grains in the material, i.e., the matrix grains. More specifically, there can be obtained a material having a textural structure wherein the proportion of the total area of matrix grains of 0.1 to 10 μm$^2$ in area to the total area of all the matrix grains present in an arbitrary two-dimensional cross section in the material is 30 to 90%, and wherein the proportion of the number of matrix grains of 2 to 10 in aspect ratio to the number of all the silicon nitride crystal grains is at least 20%. The reason for this has not been elucidated yet, but is believed to be that Fe or the Fe element compound is dissolved in a liquid phase formed in the grain boundary phase around silicon nitride crystal grains during sintering to perform such a function of changing the composition and viscosity of the liquid phase that it may exert some influences on matrix grain growth and rearrangement which may be brought about by dissolution and reprecipitation thereof in the liquid phase.

When the Fe or Fe element compound powder that may be added is larger than 10 μm in average particle size, it may probably be hard to dissolve in the liquid phase during sintering, whereby it may probably result in decreases in abrasion resistance and toughness to rather exert adverse influences on sliding properties. Accordingly, the particle size of the powder is desired to be as small as possible, and at least preferred to be at most 10 μm, further preferably at most 1 μm.

When the amount of it added is smaller than 0.0005 wt. %, the foregoing texture-controlling effect can hardly be obtained. On the other hand, when it exceeds 0.05 wt. %, there may easily arise abnormal growth of matrix crystal grains and an unnecessary increase in the amount of the grain boundary phase. Accordingly, it is desirably in the aforementioned range, further preferably in the range of 0.001 to 0.02 wt. %. Meanwhile, some commercially available starting material powders contain a small amount, in the above-mentioned range, of Fe component particles as an impurity. These particles are large particles exceeding 10 μm, usually several tens of μm, which are not dissolved in the liquid phase during sintering to remain intact, whereby the sliding properties of the resulting material are deteriorated. In such a case, therefore, it is desired that these particles be preliminarily removed with a magnetic filter or the like, followed by addition of a fine Fe component powder.

According to the present invention, a sliding material further excellent in sliding properties can be obtained by controlling the amount of the added sintering aid to at most a given value in addition to the pore control through heat treatment before sintering and the texture control through addition of the Fe component. More specifically, the total amount of the sintering aid added is preliminarily set to be at most 15 vol. % in the course of initial powder mixing. In actual blending of the starting materials, the amounts, in terms of vol. %, of them to be added are estimated from the respective values of volume found out by dividing the weights of respective weighed-out components as main component silicon nitride and additives by the respective theoretical densities thereof. Thus, the amount of the grain boundary phase in the final sintered body can be controlled to at most 15 vol. %. Especially preferred sintering aids include $Y_2O_3$ as a rare earth element compound, $Al_2O_3$ as an aluminum element compound, MgO as an alkaline earth element compound, and $TiO_2$ and $ZrO_2$ as transition metal element compounds. They may be used, for example, in such a way that $Y_2O_3$ as the indispensable component is used in combination with at least one selected from the group consisting of $Al_2O_3$, MgO, $MgAl_2O_4$, $TiO_2$ and $ZrO_2$.

The following Examples will illustrate the present invention.

EXAMPLE

Powder mixtures of 91 wt. % of a commercially available $Si_3N_4$ powder (α-crystal content: 95%, average particle size: 0.5 μm), 4.5 wt. % of an $Y_2O_3$ powder of 0.6 μm in average particle size and 4.5 wt. % of an $Al_2O_3$ powder of 0.7 μm in average particle size (in this case, the volume proportion of the sintering aid was 7.0 vol. % when the theoretical densities of $Si_3N_4$, $Y_2O_3$ and $Al_2O_3$ were 3.4 g/cm$^3$, 5.0 g/cm$^3$ and 4.0 g/cm$^3$, respectively), either as such (i.e., Nos. 1, 2, 29, 34 and 38 in the following Table 1) or after admixed with an Fe powder having a variety of average particle size in an amount as shown in the following Table 1 (i.e., Nos. 3 to 28 and 30 to 33 in Table 1), were molded to obtain molded bodies, which was then heat-treated in nitrogen under reduced pressure at a varied temperature for a varied period of time as shown in the same Table. There also were prepared molded bodies not heat-treated (i.e., Nos. 1 and 13 in Table 1). Thereafter, they were sintered in nitrogen under ordinary pressure at 1,700° C. (i.e., Nos. 1 to 24 in Table 1) or at a varied temperature (i.e., Nos. 25 to 28) for 3 hours.

Besides the above sintered bodies, powder mixtures prepared by admixing the same $Si_3N_4$ powder with a variety of sintering aid powder of 0.5 μm in average particle size other than the above-mentioned components as shown in Nos. 34 to 40 in Table 1 and powder mixtures prepared using the same $Si_3N_4$, $Y_2O_3$ and $Al_2O_3$ powders as mentioned above in varied blending amounts as shown in Nos. 30 to 33 in the same Table were molded and sintered bodies were prepared under varied heat treatment and sintering conditions as mentioned in the same Table. Incidentally, for comparison, there also were prepared a commercially available dense silicon nitride sintered body (No. 41), a high-strength sintered body of at least 99% in relative density corresponding to the aforementioned conventional material (No. 43, product subjected to HIP treatment after sintering under ordinary pressure), and an ordinary-pressure sintered body (No. 42) of 89% in relative density before HIP treatment in No. 43.

TABLE 1

Sample Formation Conditions

| No. | Kind and Amount of Sintering Aid** | | Average Particle Size and Amount of Fe | | Heat Treatment | | | Sintering | | |
|---|---|---|---|---|---|---|---|---|---|---|
| | | | (μm) | (wt. %) | N₂ Pressure (Torr) | Temp. (° C.) | Time (Hr) | Atmosphere | Temp. (° C.) | Time (Hr) |
| *1 | Y₂O₃ 4.5 (3.1) | Al₂O₃ 4.5 (3.9) | — | 0 | — | — | — | N₂ under ordinary pressure | 1700 | 3 |
| 2 | " | " | — | 0 | 380 | 1200 | 2 | " | 1700 | 3 |
| 3 | " | " | 0.8 | 0.0003 | 380 | 1200 | 2 | " | 1700 | 3 |
| 4 | " | " | 0.8 | 0.0005 | 380 | 1200 | 2 | " | 1700 | 3 |
| 5 | " | " | 0.8 | 0.001 | 380 | 1200 | 2 | " | 1700 | 3 |
| 6 | " | " | 0.8 | 0.02 | 380 | 1200 | 2 | " | 1700 | 3 |
| 7 | " | " | 0.8 | 0.05 | 380 | 1200 | 2 | " | 1700 | 3 |
| 8 | " | " | 0.8 | 0.08 | 380 | 1200 | 2 | " | 1700 | 3 |
| 9 | " | " | 15 | 0.02 | 380 | 1200 | 2 | " | 1700 | 3 |
| 10 | " | " | 5 | 0.02 | 380 | 1200 | 2 | " | 1700 | 3 |
| 11 | " | " | 1 | 0.02 | 380 | 1200 | 2 | " | 1700 | 3 |
| 12 | " | " | 0.5 | 0.02 | 380 | 1200 | 2 | " | 1700 | 3 |
| *13 | " | " | 0.8 | 0.02 | — | — | — | " | 1700 | 3 |
| 14 | " | " | 0.8 | 0.02 | 500 | 1200 | 2 | " | 1700 | 3 |
| *15 | " | " | 0.8 | 0.02 | 760 | 1200 | 2 | " | 1700 | 3 |
| *16 | " | " | 0.8 | 0.02 | 380 | 980 | 2 | " | 1700 | 3 |
| 17 | " | " | 0.8 | 0.02 | 380 | 1000 | 2 | " | 1700 | 3 |
| 18 | " | " | 0.8 | 0.02 | 380 | 1450 | 2 | " | 1700 | 3 |
| *19 | " | " | 0.8 | 0.02 | 380 | 1560 | 2 | " | 1700 | 3 |
| 20 | " | " | 0.8 | 0.02 | 380 | 1200 | 0.3 | " | 1700 | 3 |
| 21 | " | " | 0.8 | 0.02 | 380 | 1200 | 0.5 | " | 1700 | 3 |
| 22 | " | " | 0.8 | 0.02 | 380 | 1200 | 1 | " | 1700 | 3 |
| 23 | " | " | 0.8 | 0.02 | 380 | 1200 | 8 | " | 1700 | 3 |
| 24 | " | " | 0.8 | 0.02 | 380 | 1200 | 12 | " | 1700 | 3 |
| *25 | " | " | 0.8 | 0.02 | 380 | 1200 | 2 | " | 1500 | 3 |
| 26 | " | " | 0.8 | 0.02 | 380 | 1200 | 2 | " | 1600 | 3 |
| 27 | " | " | 0.8 | 0.02 | 380 | 1200 | 2 | " | 1800 | 3 |
| *28 | " | " | 0.8 | 0.02 | 380 | 1200 | 2 | " | 1830 | 3 |
| 29 | " | " | — | 0 | 380 | 1200 | 2 | " | 1800 | 3 |
| 30 | Y₂O₃ 1.5 (1.0) | Al₂O₃ 1.5 (1.3) | 1 | 0.03 | 380 | 1200 | 2 | " | 1800 | 3 |
| 31 | Y₂O₃ 3.0 (2.1) | Al₂O₃ 3.0 (2.6) | 1 | 0.03 | 380 | 1200 | 2 | " | 1750 | 3 |
| 32 | Y₂O₃ 9.0 (6.4) | Al₂O₃ 9.0 (8.0) | 1 | 0.03 | 380 | 1200 | 2 | " | 1650 | 3 |
| 33 | Y₂O₃ 9.0 (6.4) | Al₂O₃ 11.0 (9.8) | 1 | 0.03 | 380 | 1200 | 2 | " | 1600 | 3 |
| 34 | CeO₂ 3.0 (1.5) | AlN 5.0 (5.2) | — | 0 | 500 | 1300 | 2 | " | 1750 | 2 |
| 35 | " | " | 1 | 0.05 | 500 | 1300 | 2 | " | 1750 | 2 |
| 36 | CeO₂ 3.0 (1.5) TiO₂ 1.0 (0.8) | AlN 4.0 (4.2) | 1 | 0.05 | 400 | 1250 | 4 | " | 1730 | 3 |
| 37 | La₂O₃ 2.5 (1.3) MgAl₂O₄ 5.0 (4.8) | | 1 | 0.05 | 200 | 1350 | 5 | N₂ + Ar under ordinary pressure | 1730 | 4 |
| 38 | Y₂O₃ 6.0 (4.2) ZrO₂ 2.0 (1.2) | MgO 2.0 (1.9) | 0 | 0 | 200 | 1400 | 5 | N₂ + Ar under ordinary pressure | 1760 | 3 |
| 39 | Y₂O₃ 4.0 (2.7) Y₂O₆ 1.0 (1.0) | AlN 4.0 (4.2) | 1 | 0.04 | 700 | 1300 | 4 | N₂ under 5 atm. | 1700 | 5 |
| 40 | Y₂O₃ 3.0 (2.1) WO₃ 1.0 (0.5) | CaCO₃ 4.0 (5.0) | 0.1 | 0.03 | 760 | 1300 | 4 | N₂ under ordinary pressure | 1700 | 5 |

Note:
*Comparative Examples.
**Numerical values are in terms of wt. %.
Numerical values in ( ) are in terms of vol. %.

These sintered bodies were cut, and their cut surfaces were polished into a specular state to form mirror surfaces, which were then subjected to an etching treatment. The etching treatment was effected using a reactive ion etching apparatus (abbreviation: RIE) under conditions involving use of a mixed gas of 95% tetrafluoromethane $CF_4$ and 5% oxygen $O_2$ as a process gas, an RF power of 100 W, and a treatment time of 1 minute. Thus, an uneven difference in level between matrix grains and the grain boundary phase was formed. Each of the surfaces was photographed using a scanning electron microscope at a magnification of 10,000, and the resulting photograph was subjected to image processing using a general-purpose image processing apparatus (image analyzer manufactured by Toyobo Co., Ltd., wherein the automatic binarization technique according to the TOKS method is adopted). Data on the area and major axis diameter/minor axis diameter ratio (aspect ratio) of every matrix grain, and the total area of the grain boundary phase were subjected to totalization and statistical processing. Table 2 shows (a) the porosity, (b) the maximum pore size, (c) the proportion of the sum of the areas of matrix grains of 0.1 to 10 $\mu m^2$ in grain area to the total area of all the matrix grains, (d) the proportion of the number of matrix grains of 2 to 10 in aspect ratio (abbreviation: AR) to the number of all the matrix grains, and (e) the volume proportion of the grain boundary phase for each of the sintered bodies formed under respective conditions. The same Table also shows (f) the four-point flexural strength in accordance with JIS R1601 and (g) the Charpy impact value for each of test pieces formed under the same conditions as in the cases of the corresponding samples and then processed.

Further, a abrasion test on ceramics was done by the ball-on-disk method in accordance with JIS R1613 for evaluation of the friction and abrasion properties of the obtained sintered bodies. Table 2 also shows the results of comparison in the test at room temperature as to the friction coefficient of each sample, the amount of ball abrasion, and whether or not chipping occurred.

structure is low in friction coefficient, slight in specific amount of abrasion and high in impact resistance during sliding, as compared with conventional materials, to exhibit excellent friction and abrasion resistance.

According to the present invention, there can be provided a silicon nitride ceramic sliding material excellent in friction and abrasion resistance.

What is claimed is:

1. A silicon nitride ceramic sliding material comprising silicon nitride crystal grains and a grain boundary phase and

TABLE 2

Results of Evaluation of Sample

| No. | (a) porosity (%) | (b) Maximum Pore Size (μm) | (c) Areal Proportion of Grains of 0.1 to 10 μm² in Area (%) | (d) Proportion of Grains of 2 to 10 in AR (%) | (e) Volume Proportion of Grain Boundary (%) | (f) Four-Point Flexural Strength (kg/mm²) | (g) Charpy Impact Value (kJ/m²) | (h) Friction Co-efficient | (i) Specific Amount of Abrasion $10^{-14}$ (m/N) | (j) Chipping |
|---|---|---|---|---|---|---|---|---|---|---|
| *1 | 15 | 250 | 95 | 15 | 7.0 | 60 | 4 | 0.90 | 1.00 | chipped |
| 2 | 2.2 | 30 | 92 | 17 | 7.0 | 123 | 15 | 0.10 | 0.10 | not chipped |
| 3 | 2.3 | 27 | 91 | 18 | 7.0 | 135 | 16 | 0.09 | 0.08 | not chipped |
| 4 | 2.1 | 25 | 77 | 30 | 7.0 | 163 | 29 | 0.03 | 9.03 | not chipped |
| 5 | 2.1 | 23 | 77 | 31 | 7.0 | 163 | 29 | 0.03 | 0.03 | not chipped |
| 6 | 2.1 | 21 | 78 | 35 | 7.0 | 162 | 29 | 0.02 | 0.04 | not chipped |
| 7 | 2.2 | 29 | 89 | 21 | 7.0 | 132 | 19 | 0.10 | 0.09 | not chipped |
| 8 | 2.9 | 38 | 94 | 10 | 7.0 | 100 | 9.5 | 0.30 | 0.20 | not chipped |
| 9 | 2.5 | 35 | 94 | 7 | 7.0 | 98 | 8.2 | 0.40 | 0.30 | not chipped |
| 10 | 2.0 | 21 | 80 | 33 | 7.0 | 152 | 19 | 0.03 | 0.04 | not chipped |
| 11 | 2.0 | 21 | 77 | 35 | 7.0 | 160 | 29 | 0.02 | 0.04 | not chipped |
| 12 | 2.0 | 21 | 76 | 36 | 7.0 | 166 | 25 | 0.02 | 0.04 | not chipped |
| *13 | 13 | 220 | 85 | 25 | 7.0 | 85 | 7.0 | 0.50 | 0.50 | chipped |
| 14 | 3.2 | 21 | 84 | 25 | 7.0 | 148 | 18 | 0.07 | 0.06 | not chipped |
| *15 | 3.4 | 110 | 83 | 24 | 7.0 | 112 | 7.8 | 0.45 | 0.35 | chipped |
| *16 | 11 | 130 | 84 | 26 | 7.0 | 88 | 7.4 | 0.50 | 0.40 | chipped |
| 17 | 9.0 | 50 | 82 | 23 | 7.0 | 132 | 10 | 0.08 | 0.07 | not chipped |
| 18 | 2.1 | 20 | 82 | 24 | 7.0 | 165 | 28 | 0.03 | 0.04 | not chipped |
| *19 | 11 | 115 | 83 | 24 | 7.0 | 90 | 7.3 | 0.50 | 0.40 | chipped |
| 20 | 9.5 | 70 | 82 | 23 | 7.0 | 109 | 10.5 | 0.30 | 0.30 | not chipped |
| 21 | 8.0 | 55 | 84 | 24 | 7.0 | 136 | 13 | 0.09 | 0.08 | not chipped |
| 22 | 6.0 | 43 | 83 | 24 | 7.0 | 150 | 13 | 0.08 | 0.07 | not chipped |
| 23 | 2.0 | 21 | 83 | 25 | 7.0 | 159 | 22 | 0.05 | 0.05 | not chipped |
| 24 | 1.5 | 16 | 82 | 24 | 7.0 | 165 | 9.0 | 0.20 | 0.08 | not chipped |
| *25 | 9.8 | 98 | 32 | 6 | 7.0 | 99 | 7.9 | 0.50 | 0.40 | chipped |
| 26 | 4.5 | 32 | 40 | 21 | 7.0 | 142 | 13 | 0.06 | 0.10 | not chipped |
| 27 | 2.1 | 22 | 83 | 35 | 7.0 | 153 | 24 | 0.03 | 0.03 | not chipped |
| *28 | 1.8 | 18 | 91 | 39 | 7.0 | 121 | 10 | 0.10 | 0.20 | chipped |
| 29 | 2.2 | 30 | 95 | 13 | 7.0 | 111 | 5 | 0.30 | 0.60 | not chipped |
| 30 | 2.2 | 23 | 80 | 30 | 2.3 | 168 | 31 | 0.02 | 0.08 | not chipped |
| 31 | 2.2 | 24 | 77 | 34 | 4.7 | 152 | 27 | 0.04 | 0.07 | not chipped |
| 32 | 2.1 | 23 | 60 | 36 | 4.4 | 138 | 20 | 0.05 | 0.07 | not chipped |
| 33 | 2.2 | 23 | 55 | 38 | 6.2 | 130 | 15 | 0.06 | 0.04 | not chipped |
| 34 | 2.3 | 26 | 91 | 15 | 6.7 | 112 | 10 | 0.10 | 0.30 | not chipped |
| 35 | 2.4 | 28 | 75 | 29 | 6.7 | 140 | 22 | 0.03 | 0.02 | not chipped |
| 36 | 2.1 | 33 | 78 | 31 | 6.5 | 142 | 21 | 0.03 | 0.03 | not chipped |
| 37 | 2.1 | 45 | 70 | 29 | 6.1 | 130 | 18 | 0.05 | 0.04 | not chipped |
| 38 | 2.3 | 22 | 92 | 10 | 7.3 | 110 | 6 | 0.20 | 0.40 | not chipped |
| 39 | 2.2 | 30 | 82 | 32 | 7.9 | 123 | 16 | 0.10 | 0.05 | not chipped |
| 40 | 2.4 | 24 | 78 | 32 | 7.6 | 154 | 24 | 0.03 | 0.02 | not chipped |
| *41 | 0.5 | 15 | 91 | 17 | 6.0 | 71 | 4 | 0.90 | 1.00 | not chipped |
| *42 | 11 | 180 | 25 | 2 | 7.0 | 35 | 2 | 0.88 | 1.00 | chipped |
| *43 | 0.1 | 5 | 77 | 33 | 7.0 | 185 | 10 | 0.60 | 0.80 | not chipped |

*indicates Comparative Examples

Additionally stated, although Samples Nos. 41 and 43 were not chipped under friction and abrasion test conditions in this Example, it is believed that these samples are more liable to chipping under high-speed sliding conditions involving a tap abrasion phenomenon because they are low in Charpy impact value and poor in impact resistance as compared with the products according to the present invention. It is understood from the foregoing results that the silicon nitride ceramic sliding material of the present invention having a peculiar pore, grain and grain boundary having a porosity of 1 to 10% and a maximum pore size of 20 to 100 μm, the total area of silicon nitride crystal grains of 0.1 to 10 μm² in area accounting for 30 to 90% of the total area of all the silicon nitride crystal grains when the areas of all the silicon nitride crystal grains present in an arbitrary two-dimensional cross section are counted and the proportion of the number of all the silicon nitride crystal grains of 2 to 10 in aspect ratio to the number of all the silicon nitride crystal grains being at least 20%, said grain boundary base containing Y and at least one element selected from the group consisting of Al, Mg, Ti and Zr and the amount of said grain boundary is more than 0 volume % and at most 15%.

2. A silicon nitride ceramic sliding material of claim 1 also containing Fe or an Fe element compound in an amount of 0.0005 to 0.05% by weight of Fe element.

3. A process for producing a silicon nitride ceramic sliding material of claim 1, comprising mixing a silicon nitride powder with a sintering aid powder to prepare a mixture, molding said mixture to obtain a molded body, then heat-treating said molded body in a nitrogen-containing atmosphere under reduced pressure at 1,000 to 1,500° C., and then sintering it in a nonoxidizing atmosphere under ordinary pressure or in a nonoxidizing gas atmosphere under pressure in the temperature range of 1,550 to 1,800° C.

4. A process as claimed in claim 3 wherein said mixture of said silicon nitride powder with said sintering aid powder is further admixed with an Fe or Fe element compound powder of at most 10 $\mu$m in average particle size, the amount of which is 0.0005 to 0.05 wt. % in terms of Fe element.

5. A process as claimed in claim 3 wherein the amount of said sintering aid powder in said mixture is at most 15 vol. %.

6. A process as claimed in claim 5 wherein said sintering aid powder is an $Y_2O_3$ powder mixed with at least one selected from the group consisting of $Al_2O_3$, MgO, $MgAl_2O_4$, $TiO_2$, and $ZrO_2$.

* * * * *